(12) United States Patent
Nguyen et al.

(10) Patent No.: US 12,526,821 B2
(45) Date of Patent: Jan. 13, 2026

(54) SIDELINK RESOURCE REMOVAL

(71) Applicant: QUALCOMM Incorporated, San Diego, CA (US)

(72) Inventors: Tien Viet Nguyen, Bridgewater, NJ (US); Dan Vassilovski, Del Mar, CA (US); Sourjya Dutta, San Diego, CA (US); Kapil Gulati, Belle Mead, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 323 days.

(21) Appl. No.: 18/464,585

(22) Filed: Sep. 11, 2023

(65) Prior Publication Data

US 2025/0089072 A1    Mar. 13, 2025

(51) Int. Cl.
*H04W 72/25*    (2023.01)

(52) U.S. Cl.
CPC .................................. *H04W 72/25* (2023.01)

(58) Field of Classification Search
USPC .... 370/229, 230, 230.1, 236, 252, 328, 329, 370/330, 332
See application file for complete search history.

(56) References Cited

U.S. PATENT DOCUMENTS

| | | | | |
|---|---|---|---|---|
| 2020/0413348 A1* | 12/2020 | Ryu | ...................... | H04W 52/241 |
| 2022/0132558 A1* | 4/2022 | Lee | ...................... | H04W 24/10 |
| 2022/0232575 A1* | 7/2022 | Lee | ...................... | H04W 72/56 |
| 2022/0377761 A1* | 11/2022 | Lee | ...................... | H04W 72/20 |
| 2022/0394698 A1* | 12/2022 | Lee | ...................... | H04W 52/281 |

* cited by examiner

*Primary Examiner* — Nguyen H Ngo
(74) *Attorney, Agent, or Firm* — Harrity & Harrity LLP/Qualcomm Incorporated

(57) ABSTRACT

Various aspects of the present disclosure generally relate to wireless communication. In some aspects, a user equipment (UE) may receive a physical sidelink feedback channel (PSFCH) transmission associated with a semi-persistent scheduling (SPS) grant. The UE may transmit an indication of a removal of a resource associated with the SPS grant, wherein the removal of the resource is based at least in part on a signal power associated with the PSFCH transmission satisfying a signal power threshold. Numerous other aspects are described.

20 Claims, 9 Drawing Sheets

SIDELINK RESOURCE REMOVAL

FIELD OF THE DISCLOSURE

Aspects of the present disclosure generally relate to wireless communication and to techniques and apparatuses for sidelink resource removal.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more network nodes that support communication for wireless communication devices, such as a user equipment (UE) or multiple UEs. A UE may communicate with a network node via downlink communications and uplink communications. "Downlink" (or "DL") refers to a communication link from the network node to the UE, and "uplink" (or "UL") refers to a communication link from the UE to the network node. Some wireless networks may support device-to-device communication, such as via a local link (e.g., a sidelink (SL), a wireless local area network (WLAN) link, and/or a wireless personal area network (WPAN) link, among other examples).

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a user equipment (UE) for wireless communication. The user equipment may include one or more memories and one or more processors coupled to the one or more memories. The one or more processors may be configured to cause the UE to receive a physical sidelink feedback channel (PSFCH) transmission associated with a semi-persistent scheduling (SPS) grant. The one or more processors may be configured to cause the UE to transmit an indication of a removal of a resource associated with the SPS grant, wherein the removal of the resource is based at least in part on a signal power associated with the PSFCH transmission satisfying a signal power threshold.

Some aspects described herein relate to a method of wireless communication performed by a UE. The method may include receiving a PSFCH transmission associated with an SPS grant. The method may include transmitting an indication of a removal of a resource associated with the SPS grant, wherein the removal of the resource is based at least in part on a signal power associated with the PSFCH transmission satisfying a signal power threshold.

Some aspects described herein relate to a non-transitory computer-readable medium that stores a set of instructions for wireless communication by a UE. The set of instructions, when executed by one or more processors of the UE, may cause the UE to receive a PSFCH transmission associated with an SPS grant. The set of instructions, when executed by one or more processors of the UE, may cause the UE to transmit an indication of a removal of a resource associated with the SPS grant, wherein the removal of the resource is based at least in part on a signal power associated with the PSFCH transmission satisfying a signal power threshold.

Some aspects described herein relate to an apparatus for wireless communication. The apparatus may include means for receiving a PSFCH transmission associated with an SPS grant. The apparatus may include means for transmitting an indication of a removal of a resource associated with the SPS grant, wherein the removal of the resource is based at least in part on a signal power associated with the PSFCH transmission satisfying a signal power threshold.

Aspects generally include a method, apparatus, system, computer program product, non-transitory computer-readable medium, user equipment, base station, network entity, network node, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Figure 1:
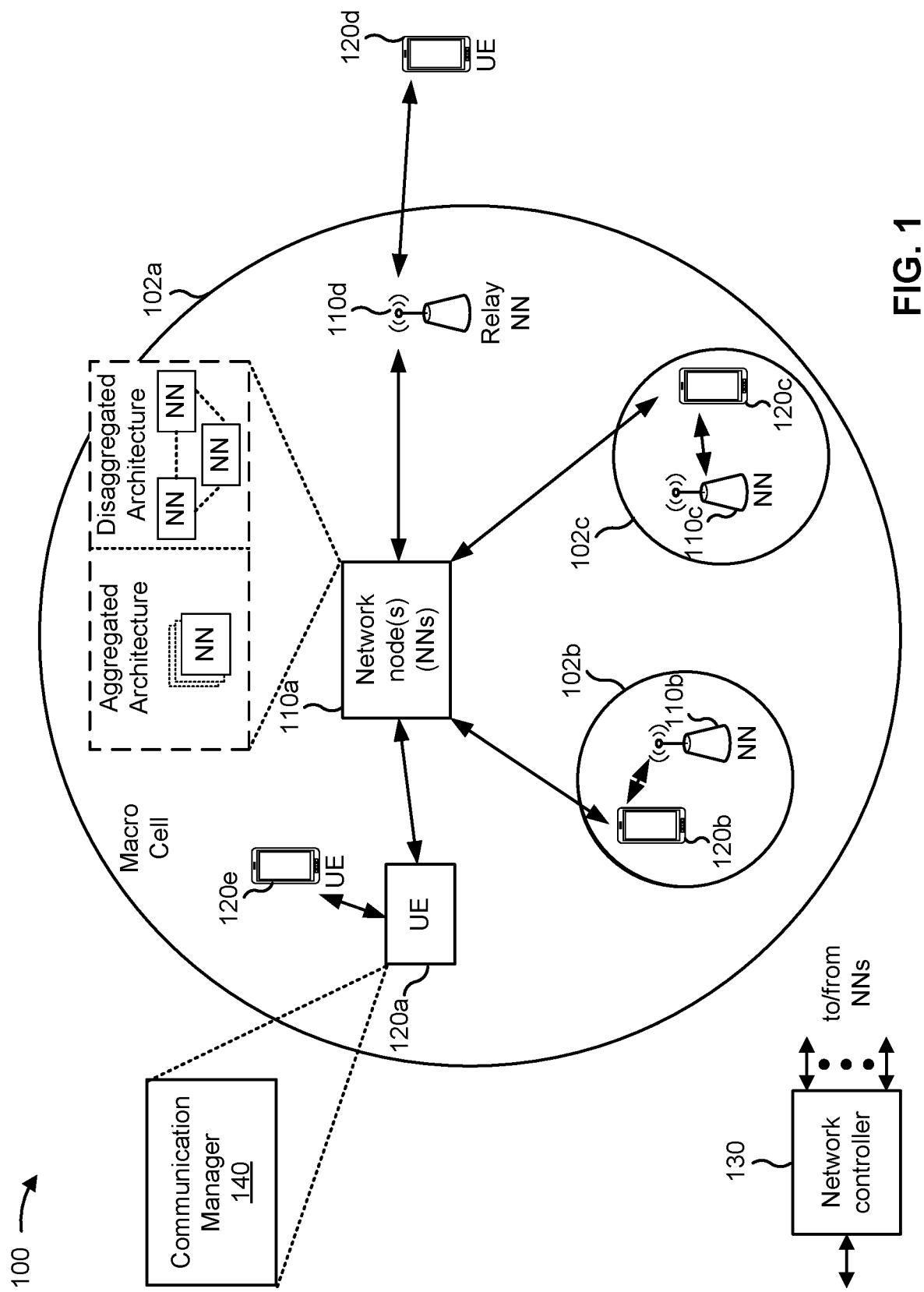
FIG. 1 is a diagram illustrating an example of a wireless network, in accordance with the present disclosure.

In New Radio (NR) sidelink, negative acknowledgment (NACK) based retransmission can be used to recover from packet reception failure. However, failures can be minor failures or major failures. If a failure is minor, then the resource may continue to be used for transmission while relying on retransmission for recovery because frequent resource reselection can contribute to the instability of an overall interference pattern for at least one sidelink user equipment (UE) while providing limited improvements to packet reception reliability. If the failure is major, then continuing to use the same resource for transmission may be sub-optimal. For example, sidelink resource reservations—and, thus, interference—may be periodic. As a result, the reserved resource may experience consistent (e.g., periodic) interference. Therefore, retransmission for that resource may be consistently triggered, and the retransmission may consume an extra resource.

Various aspects relate generally to sidelink transmissions. Some aspects more specifically relate to sidelink resource removal. In some examples, a UE transmits data associated with an SPS grant and receives a PSFCH transmission associated with the SPS grant. The UE identifies a signal power associated with the PSFCH transmission, identifies that the signal power satisfies a signal power threshold, and transmits an indication of a removal of a resource associated with the SPS grant. The signal power threshold may be based at least in part on a congestion level and/or a priority of a sidelink packet.

Particular aspects of the subject matter described in this disclosure can be implemented to realize one or more of the following potential advantages. In some examples, by basing the removal of the resource at least in part on the signal power associated with the PSFCH transmission satisfying the signal power threshold, the described techniques can be used to reselect to a resource where the data experiences less interference. As a result, the UE may avoid interference, which may improve data transmission, and/or avoid retransmission (e.g., based on the PSFCH triggering the retransmission), which may prevent consumption of extra resources for the transmission. Moreover, the removal of the resource being based at least in part on the signal power satisfying the signal power threshold may help to limit removal and/or reselection of resources to those resources for which the signal power satisfies the signal power threshold. Limiting removal and/or reselection of resources may contribute to the stability of the interference pattern associated with sidelink transmissions. The signal power threshold being based at least in part on the congestion level may enable the signal power threshold to accurately reflect whether a failure is a major failure. The signal power threshold is based at least in part on a priority of a sidelink packet may enable the signal power threshold to reflect whether a failure is a major failure based on priority.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more network nodes 110 (shown as a network node 110a, a network node 110b, a network node 110c, and a network node 110d), a UE 120 or multiple UEs 120 (shown as a UE 120a, a UE 120b, a UE 120c, a UE 120d, and a UE 120e), and/or other entities. A network node 110 is a network node that communicates with UEs 120. As shown, a network node 110 may include one or more network nodes. For example, a network node 110 may be an aggregated network node, meaning that the aggregated network node is configured to utilize a radio protocol stack that is physically or logically integrated within a single radio access network (RAN) node (e.g., within a single device or unit). As another example, a network node 110 may be a disaggregated network node (sometimes referred to as a disaggregated base station), meaning that the network node 110 is configured to utilize a protocol stack that is physically or logically distributed among two or more nodes (such as one or more central units (CUs), one or more distributed units (DUs), or one or more radio units (RUS)).

In some examples, a network node 110 is or includes a network node that communicates with UEs 120 via a radio access link, such as an RU. In some examples, a network node 110 is or includes a network node that communicates with other network nodes 110 via a fronthaul link or a midhaul link, such as a DU. In some examples, a network node 110 is or includes a network node that communicates with other network nodes 110 via a midhaul link or a core network via a backhaul link, such as a CU. In some examples, a network node 110 (such as an aggregated network node 110 or a disaggregated network node 110) may include multiple network nodes, such as one or more RUs, one or more CUs, and/or one or more DUs. A network node 110 may include, for example, an NR base station, an LTE base station, a Node B, an eNB (e.g., in 4G), a gNB (e.g., in 5G), an access point, a transmission reception point (TRP), a DU, an RU, a CU, a mobility element of a network, a core network node, a network element, a network equipment, a RAN node, or a combination thereof. In some examples, the network nodes 110 may be interconnected to one another or to one or more other network nodes 110 in the wireless network 100 through various types of fronthaul, midhaul, and/or backhaul interfaces, such as a direct physical connection, an air interface, or a virtual network, using any suitable transport network.

In some examples, a network node 110 may provide communication coverage for a particular geographic area. In the Third Generation Partnership Project (3GPP), the term "cell" can refer to a coverage area of a network node 110 and/or a network node subsystem serving this coverage area, depending on the context in which the term is used. A network node 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscriptions. A femto cell may cover a relatively small geographic area (e.g., a home) and may allow restricted access by UEs 120 having association with the femto cell (e.g., UEs 120 in a closed subscriber group (CSG)). A network node 110 for a macro cell may be referred to as a macro network node. A network node 110 for a pico cell may be referred to as a pico network node. A network node 110 for a femto cell may be referred to as a femto network node or an in-home network node. In the example shown in FIG. 1, the network node 110a may be a macro network node for a macro cell 102a, the network node 110b may be a pico network node for a pico cell 102b, and the network node 110c may be a femto network node for a femto cell 102c. A network node may support one or multiple (e.g., three) cells. In some examples, a cell may not necessarily be stationary, and the geographic area of the cell may move according to the location of a network node 110 that is mobile (e.g., a mobile network node).

In some aspects, the terms "base station" or "network node" may refer to an aggregated base station, a disaggregated base station, an integrated access and backhaul (IAB) node, a relay node, or one or more components thereof. For example, in some aspects, "base station" or "network node" may refer to a CU, a DU, an RU, a Near-Real Time (Near-RT) RAN Intelligent Controller (RIC), or a Non-Real Time (Non-RT) RIC, or a combination thereof. In some aspects, the terms "base station" or "network node" may refer to one device configured to perform one or more functions, such as those described herein in connection with the network node 110. In some aspects, the terms "base station" or "network node" may refer to a plurality of devices configured to perform the one or more functions. For example, in some distributed systems, each of a quantity of different devices (which may be located in the same geographic location or in different geographic locations) may be configured to perform at least a portion of a function, or to duplicate performance of at least a portion of the function, and the terms "base station" or "network node" may refer to any one or more of those different devices. In some aspects, the terms "base station" or "network node" may refer to one or more virtual base stations or one or more virtual base station functions. For example, in some aspects, two or more base station functions may be instantiated on a single device. In some aspects, the terms "base station" or "network node" may refer to one of the base station functions and not another. In this way, a single device may include more than one base station.

The wireless network 100 may include one or more relay stations. A relay station is a network node that can receive a transmission of data from an upstream node (e.g., a network node 110 or a UE 120) and send a transmission of the data to a downstream node (e.g., a UE 120 or a network node 110). A relay station may be a UE 120 that can relay transmissions for other UEs 120. In the example shown in FIG. 1, the network node 110d (e.g., a relay network node) may communicate with the network node 110a (e.g., a macro network node) and the UE 120d in order to facilitate communication between the network node 110a and the UE 120d. A network node 110 that relays communications may be referred to as a relay station, a relay base station, a relay network node, a relay node, a relay, or the like.

The wireless network 100 may be a heterogeneous network that includes network nodes 110 of different types, such as macro network nodes, pico network nodes, femto network nodes, relay network nodes, or the like. These different types of network nodes 110 may have different transmit power levels, different coverage areas, and/or different impacts on interference in the wireless network 100. For example, macro network nodes may have a high transmit power level (e.g., 5 to 40 watts) whereas pico network nodes, femto network nodes, and relay network nodes may have lower transmit power levels (e.g., 0.1 to 2 watts).

A network controller 130 may couple to or communicate with a set of network nodes 110 and may provide coordination and control for these network nodes 110. The network controller 130 may communicate with the network nodes 110 via a backhaul communication link or a midhaul communication link. The network nodes 110 may communicate with one another directly or indirectly via a wireless or wireline backhaul communication link. In some aspects, the network controller 130 may be a CU or a core network device, or may include a CU or a core network device.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, a UE function of a network node, and/or any other suitable device that is configured to communicate via a wireless or wired medium.

Some UEs 120 may be considered machine-type communication (MTC) or evolved or enhanced machine-type communication (eMTC) UEs. An MTC UE and/or an eMTC UE may include, for example, a robot, an unmanned aerial vehicle, a remote device, a sensor, a meter, a monitor, and/or a location tag, that may communicate with a network node, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120a and UE 120c) may communicate directly using one or more sidelink channels (e.g., without using a network node 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the network node 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHZ) and FR2 (24.25 GHz-52.6 GHZ). It should be understood that although a portion of FR1 is greater than 6 GHZ, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHZ-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHZ-24.25 GHZ). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHZ-71 GHz), FR4 (52.6 GHz-114.25 GHZ), and FR5 (114.25 GHZ-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHZ, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, the UE 120 may include a communication manager 140. As described in more detail elsewhere herein, the communication manager 140 may receive a PSFCH transmission associated with an SPS grant; and transmit an indication of a removal of a resource associated with the SPS grant, wherein the removal of the resource is based at least in part on a signal power associated with the PSFCH transmission satisfying a signal power threshold. Additionally, or alternatively, the communication manager 140 may perform one or more other operations described herein.

As indicated above, FIG. 1 is provided as an example. Other examples may differ from what is described with regard to FIG. 1.

Figure 2:
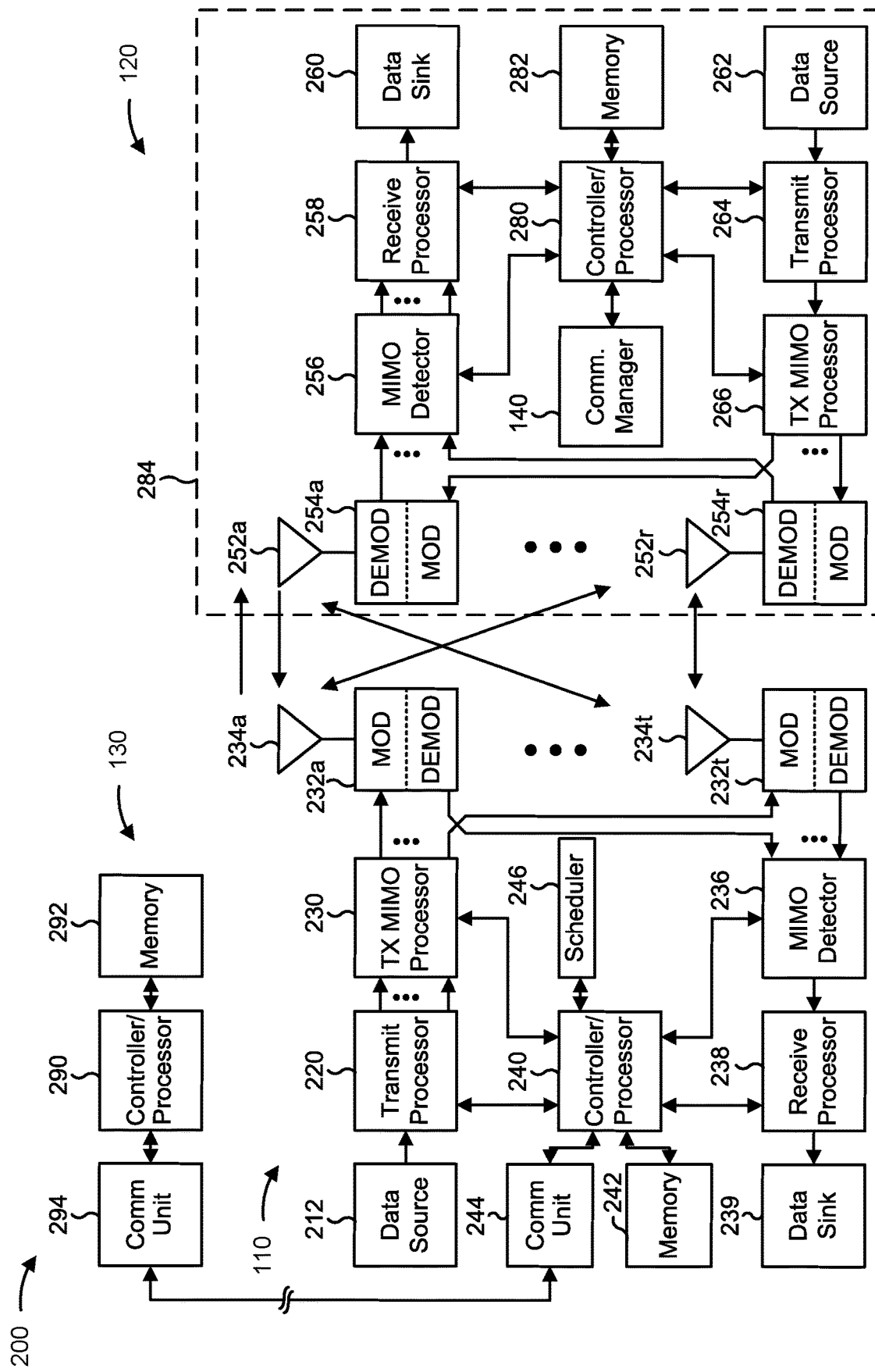
FIG. 2 is a diagram illustrating an example of a network node in communication with a user equipment (UE) in a wireless network, in accordance with the present disclosure.

FIG. 2 is a diagram illustrating an example 200 of a network node 110 in communication with a UE 120 in a wireless network 100, in accordance with the present disclosure. The network node 110 may be equipped with a set of antennas 234a through 234t, such as T antennas (T≥1). The UE 120 may be equipped with a set of antennas 252a through 252r, such as R antennas (R≥1). The network node 110 of example 200 includes one or more radio frequency components, such as antennas 234 and a modem 232. In some examples, a network node 110 may include an interface, a communication component, or another component that facilitates communication with the UE 120 or another network node. Some network nodes 110 may not include radio frequency components that facilitate direct communication with the UE 120, such as one or more CUs, or one or more DUs.

At the network node 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The network node 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the network node 110 and/or other network nodes 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the network node 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the network node 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 7-9).

At the network node 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The network node 110 may include a communication unit 244 and may communicate with the network controller 130 via the communication unit 244. The network node 110 may include a scheduler 246 to schedule one or more UEs 120 for downlink and/or uplink communications. In some examples, the modem 232 of the network node 110 may include a modulator and a demodulator. In some examples, the network node 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 7-9).

The controller/processor 240 of the network node 110, the controller/processor 280 of the UE 120, and/or any other component(s) of FIG. 2 may perform one or more techniques associated with sidelink resource removal, as described in more detail elsewhere herein. For example, the controller/processor 240 of the network node 110, the controller/processor 280 of the UE 120, and/or any other component(s) of FIG. 2 may perform or direct operations of, for example, process 800 of FIG. 8 and/or other processes as described herein. The memory 242 and the memory 282 may store data and program codes for the network node 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the network node 110 and/or the UE 120, may cause the one or more processors, the UE 120, and/or the network node 110 to perform or direct operations of, for example, process 800 of FIG. 8 and/or other processes as described herein. In some examples, executing instructions may include running the instructions, converting the instructions, compiling the instructions, and/or interpreting the instructions, among other examples.

In some aspects, the UE 120 includes means for receiving a PSFCH transmission associated with an SPS grant (e.g., using antenna 252, modem 254, MIMO detector 256, receive processor 258, controller/processor 280, memory 282, or the like); and/or means for transmitting an indication of a removal of a resource associated with the SPS grant, wherein the removal of the resource is based at least in part on a signal power associated with the PSFCH transmission satisfying a signal power threshold (e.g., using controller/processor 280, transmit processor 264, TX MIMO processor 266, modem 254, antenna 252, memory 282, or the like). The means for the UE 120 to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, an individual processor may perform all of the functions described as being performed by the one or more processors. In some aspects, one or more processors may collectively perform a set of functions. For example, a first set of (one or more) processors of the one or more processors may perform a first function described as being performed by the one or more processors, and a second set of (one or more) processors of the one or more processors may perform a second function described as being performed by the one or more processors. The first set of processors and the second set of processors may be the same set of processors or may be different sets of processors. Reference to "one or more processors" should be understood to refer to any one or more of the processors described in connection with FIG. 2. Reference to "one or more memories" should be understood to refer to any one or more memories of a corresponding device, such as the memory described in connection with FIG. 2. For example, functions described as being performed by one or more memories can be performed by the same subset of the one or more memories or different subsets of the one or more memories.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Deployment of communication systems, such as 5G NR systems, may be arranged in multiple manners with various components or constituent parts. In a 5G NR system, or network, a network node, a network entity, a mobility element of a network, a RAN node, a core network node, a network element, a base station, or a network equipment may be implemented in an aggregated or disaggregated architecture. For example, a base station (such as a Node B (NB), an evolved NB (eNB), an NR base station, a 5G NB, an access point (AP), a TRP, or a cell, among other examples), or one or more units (or one or more components) performing base station functionality, may be implemented as an aggregated base station (also known as a standalone base station or a monolithic base station) or a disaggregated base station. "Network entity" or "network node" may refer to a disaggregated base station, or to one or more units of a disaggregated base station (such as one or more CUs, one or more DUs, one or more RUs, or a combination thereof).

An aggregated base station (e.g., an aggregated network node) may be configured to utilize a radio protocol stack that is physically or logically integrated within a single RAN node (e.g., within a single device or unit). A disaggregated base station (e.g., a disaggregated network node) may be configured to utilize a protocol stack that is physically or logically distributed among two or more units (such as one or more CUs, one or more DUs, or one or more RUs). In some examples, a CU may be implemented within a network node, and one or more DUs may be co-located with the CU, or alternatively, may be geographically or virtually distributed throughout one or multiple other network nodes. The DUs may be implemented to communicate with one or more RUs. Each of the CU, DU, and RU also can be implemented as virtual units, such as a virtual central unit (VCU), a virtual distributed unit (VDU), or a virtual radio unit (VRU), among other examples.

Base station-type operation or network design may consider aggregation characteristics of base station functionality. For example, disaggregated base stations may be utilized in an IAB network, an open radio access network (O-RAN (such as the network configuration sponsored by the O-RAN Alliance)), or a virtualized radio access network (vRAN, also known as a cloud radio access network (C-RAN)) to facilitate scaling of communication systems by separating base station functionality into one or more units that can be individually deployed. A disaggregated base station may include functionality implemented across two or more units at various physical locations, as well as functionality implemented for at least one unit virtually, which can enable flexibility in network design. The various units of the disaggregated base station can be configured for wired or wireless communication with at least one other unit of the disaggregated base station.

Figure 3:
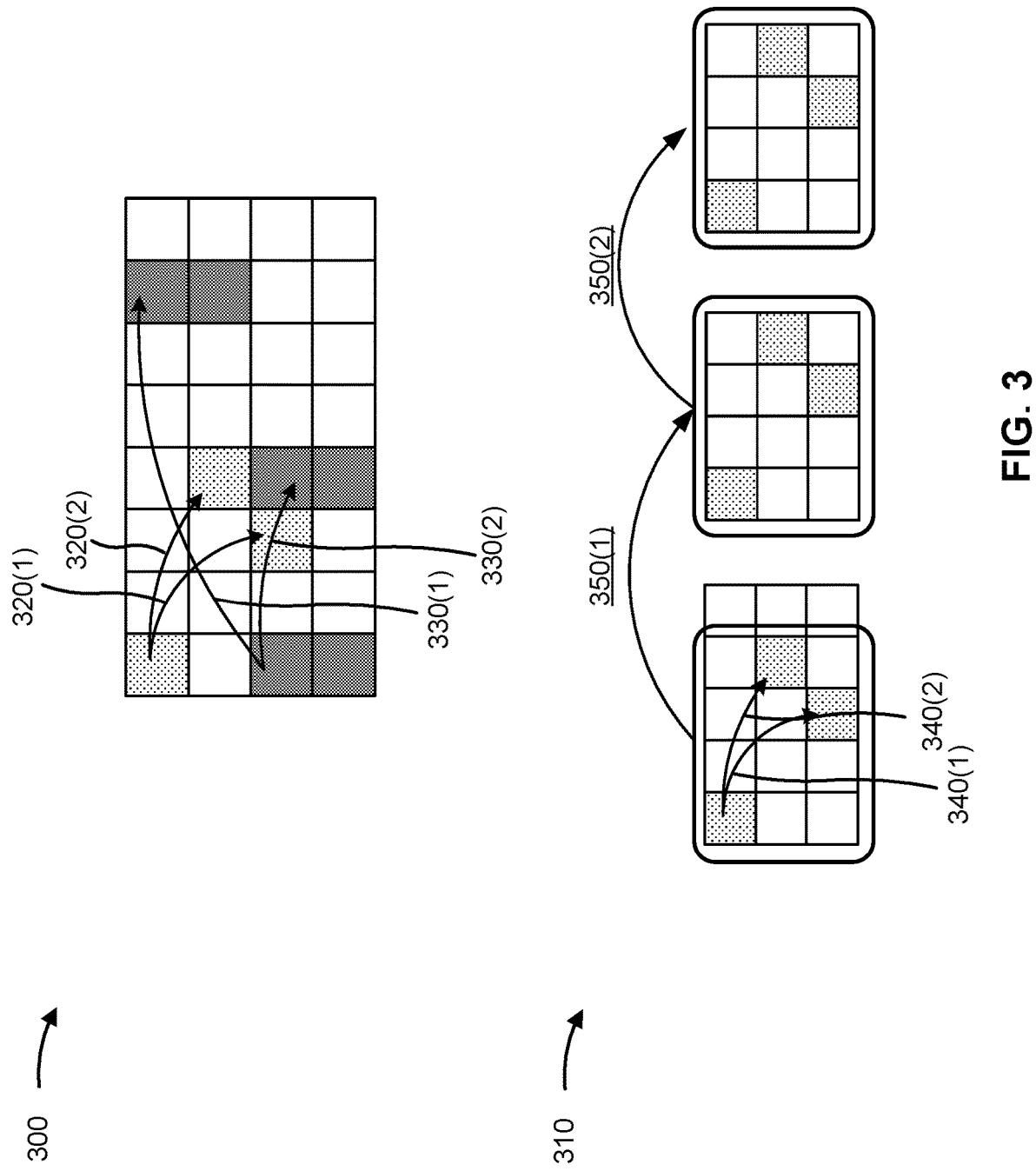
FIG. 3 is a diagram illustrating an example of aperiodic resource reservation and an example of periodic resource reservation, in accordance with the present disclosure.

FIG. 3 is a diagram illustrating an example 300 of aperiodic resource reservation and an example 310 of periodic resource reservation, in accordance with the present disclosure.

In resource allocation mode 2, resource allocation involves reservations based on the NR sidelink. Resource allocation may be in units of sub-channels in the frequency domain and limited to one slot in the time domain. A transmission may reserve resources in a current slot and up to two future slots. Reservation information may be carried in sidelink control information (SCI). Reservations may be in window of 32 logical slots.

In examples 300 and 310, as represented by arrows 320(1)-320(2), 330(1)-330(2), and 340(1)-340(2), reservation information transmitted in a resource may reserve future resources. Aperiodic and periodic resource reservations may be supported. In example 300, the resource reservation may be aperiodic (e.g., not repeating). In example 310, as represented by arrows 350(1)-350(2), the resource reservation may be periodic (e.g., repeating). For example, SCI may signal a period with configurable values between 0 ms and 1000 ms. Periodic resource reservation and signaling can be disabled by configuration (or pre-configuration).

As indicated above, FIG. 3 is provided as an example. Other examples may differ from what is described with respect to FIG. 3.

Figure 4:
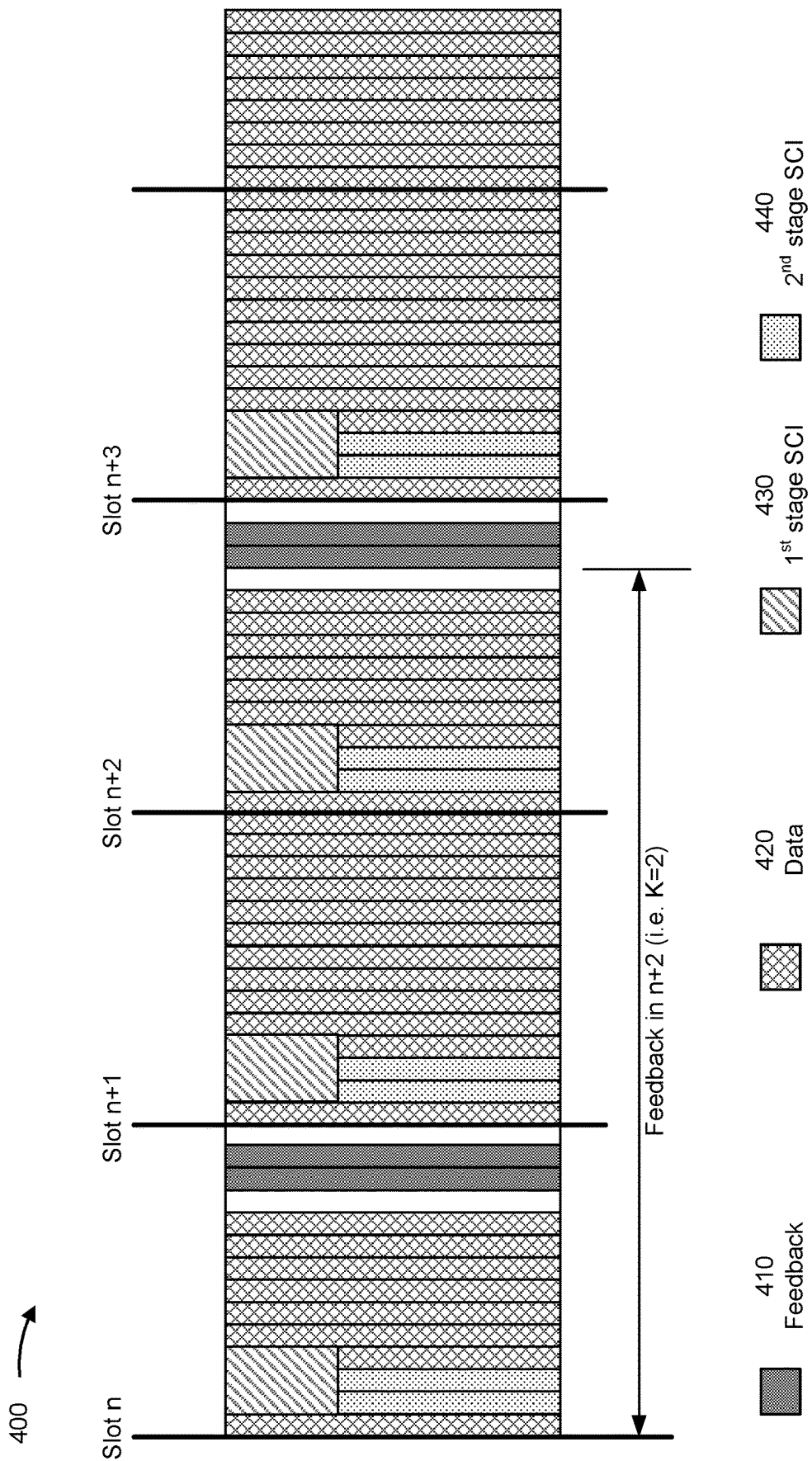
FIG. 4 is a diagram illustrating an example of physical sidelink feedback channel (PSFCH) signaling, in accordance with the present disclosure.

FIG. 4 is a diagram illustrating an example 400 of PSFCH signaling, in accordance with the present disclosure. As shown, a PSFCH transmission may include feedback 410, data 420, first-stage SCI 430, and second-stage SCI 440.

In PSFCH, resources for feedback 410 may be system-wide. The resources for the feedback 410 may be configured (or pre-configured) with a period N={1, 2, 4} slots. If configured, the feedback 410 may occupy three OFDM symbols: one gap symbol and two PSFCH symbols. The quantity of physical resource blocks (PRBs) for the actual PSFCH may be configured or pre-configured (e.g., using a bitmap).

Physical uplink control channel (PUCCH) format 0 on one resource block (RB) may carry hybrid automatic repeat request acknowledgment (HARQ-ACK) information for a single physical sidelink shared channel (PSSCH) transmission. A PSFCH format 0 sequence may be repeated on two PSFCH symbols.

PSFCH may be enabled for unicast and groupcast. PSFCH for unicast may involve a one-bit acknowledgment or negative acknowledgement (ACK/NACK). PSFCH for groupcast may have two feedback modes, option 1 and option 2. In option 1, the receiver UE may transmit only NACK; in option 2, the receiver UE may transmit an acknowledgment (ACK) or NACK.

As indicated above, FIG. 4 is provided as an example. Other examples may differ from what is described with respect to FIG. 4.

Figure 5:
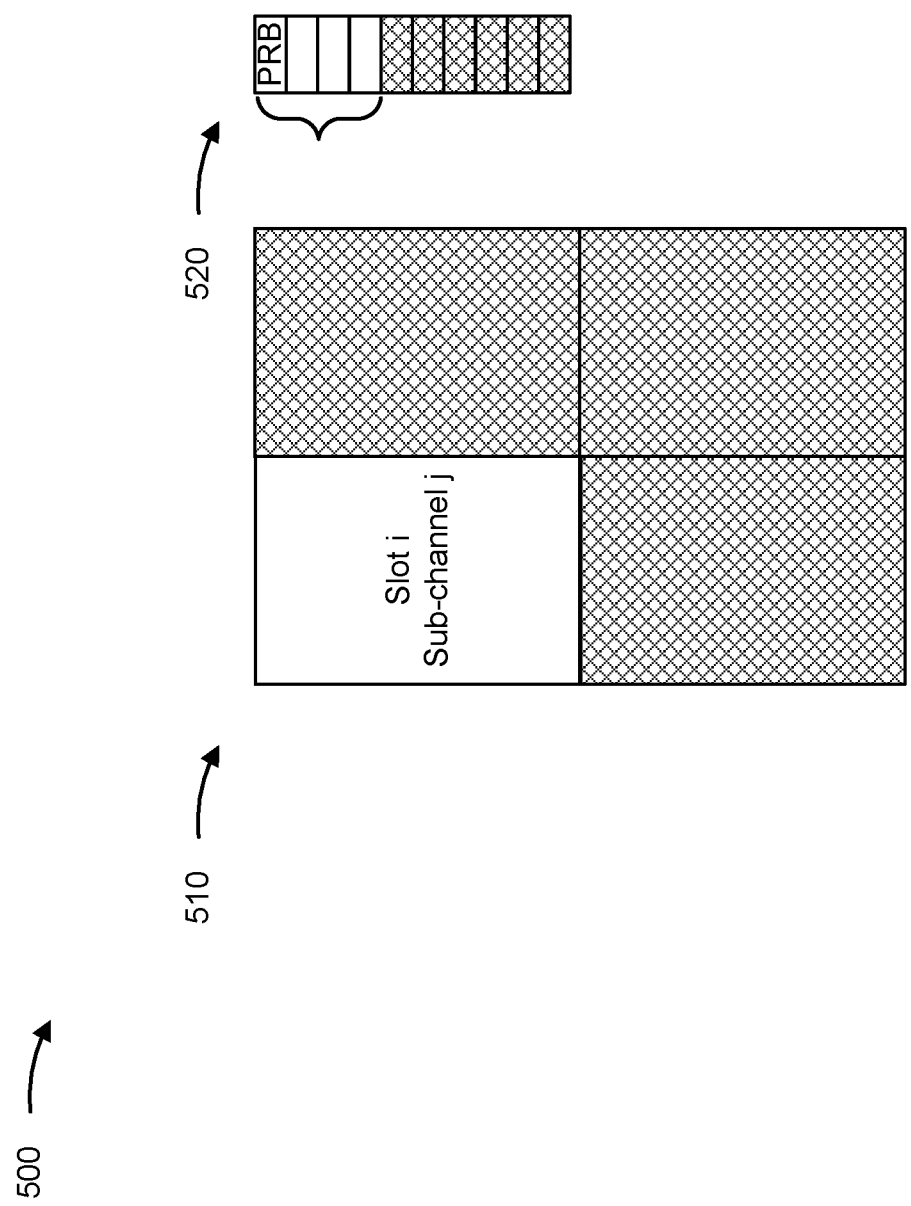
FIG. 5 is a diagram illustrating an example of PSFCH resource mapping, in accordance with the present disclosure.

FIG. 5 is a diagram illustrating an example 500 of PSFCH resource mapping, in accordance with the present disclosure. The PSFCH resource mapping may be a mapping between PSSCH resources 510 and corresponding PSFCH resources 520. The mapping may be based on the starting sub-channel of the PSSCH, the slot containing the PSSCH, a source identifier associated with the PSSCH, a destination identifier associated with the PSSCH, or the like. In some examples, the number of available PSFCH resources may be equal to or greater than the number of UEs in groupcast option 2.

As indicated above, FIG. 5 is provided as an example. Other examples may differ from what is described with respect to FIG. 5.

Figure 6:
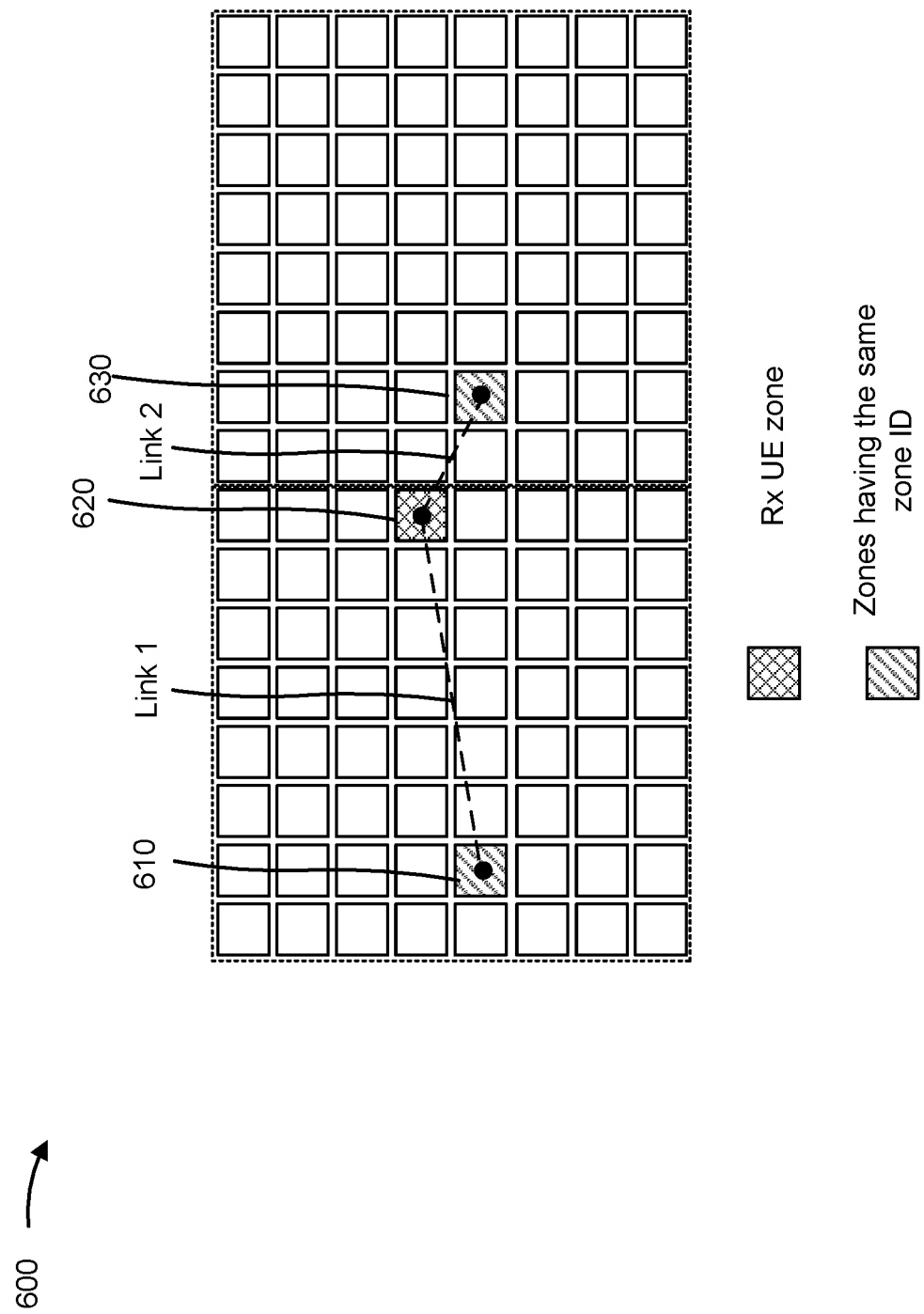
FIG. 6 is a diagram illustrating an example of distance-based feedback transmission, in accordance with the present disclosure.

FIG. 6 is a diagram illustrating an example 600 of distance-based feedback transmission, in accordance with the present disclosure.

Example 600 includes multiple zones, including zones 610, 620, and 630. Zone 610 contains a receiver UE, and zones 620 and 630 contain respective transmit UEs. In some examples, zones may be square with dimensions configured (or pre-configured) to be {5, 10, 20, 30, 40, 50} meters. The transmit UEs may indicate zone-based location indication in second stage SCI. Each zone may have a zone identifier that is determined from the geographical longitude/latitude (GLL) of a UE in that zone. A zone identifier indication may be twelve bits (e.g., the least significant bits of the sampled UE location (e.g., GLL)). Thus, a distance between a transmit UE and the received UE may be computed from the UE locations (e.g., based on the transmit UE zone identifier and the location of the receiver UE).

A minimum communication range (MCR) may be application dependent and indicated in second stage SCI. For example, the MCR may be configured to be {20, 50, 80, 100, 120, 150, 180, 200, 220, 250, 270, 300, 350, 370, 400, 420, 450, 480, 500, 550, 600, 700, 1000} meters (with eight spare values). In some examples, the MCR may be indicated in second stage SCI as an index corresponding to a 16-value subset of the configurable MCR ranges. Distance-based feedback can be enabled for groupcast feedback option 1. For example, the receiver UE may, if within a communication range (e.g., MCR), transmit a NACK if PSSCH decoding fails.

As indicated above, FIG. 6 is provided as an example. Other examples may differ from what is described with respect to FIG. 6.

In NR sidelink, NACK-based retransmission can be used to recover from packet reception failure. However, failures can be minor failures (which affect a small quantity of UEs) or major failures (which affect a large quantity of UEs). If a failure is minor, then the resource may continue to be used for transmission while relying on retransmission for recovery because frequent resource reselection can contribute to the instability of an overall interference pattern among sidelink UEs while providing limited improvements to packet reception reliability. If the failure is major, then continuing to use the same resource for transmission may be sub-optimal. For example, sidelink resource reservations—and, thus, interference—may be periodic. As a result, the chosen (e.g., reserved) resource may experience consistent interference. Therefore, retransmission for that resource may be consistently triggered, and the retransmission may consume an extra resource.

Figure 7:
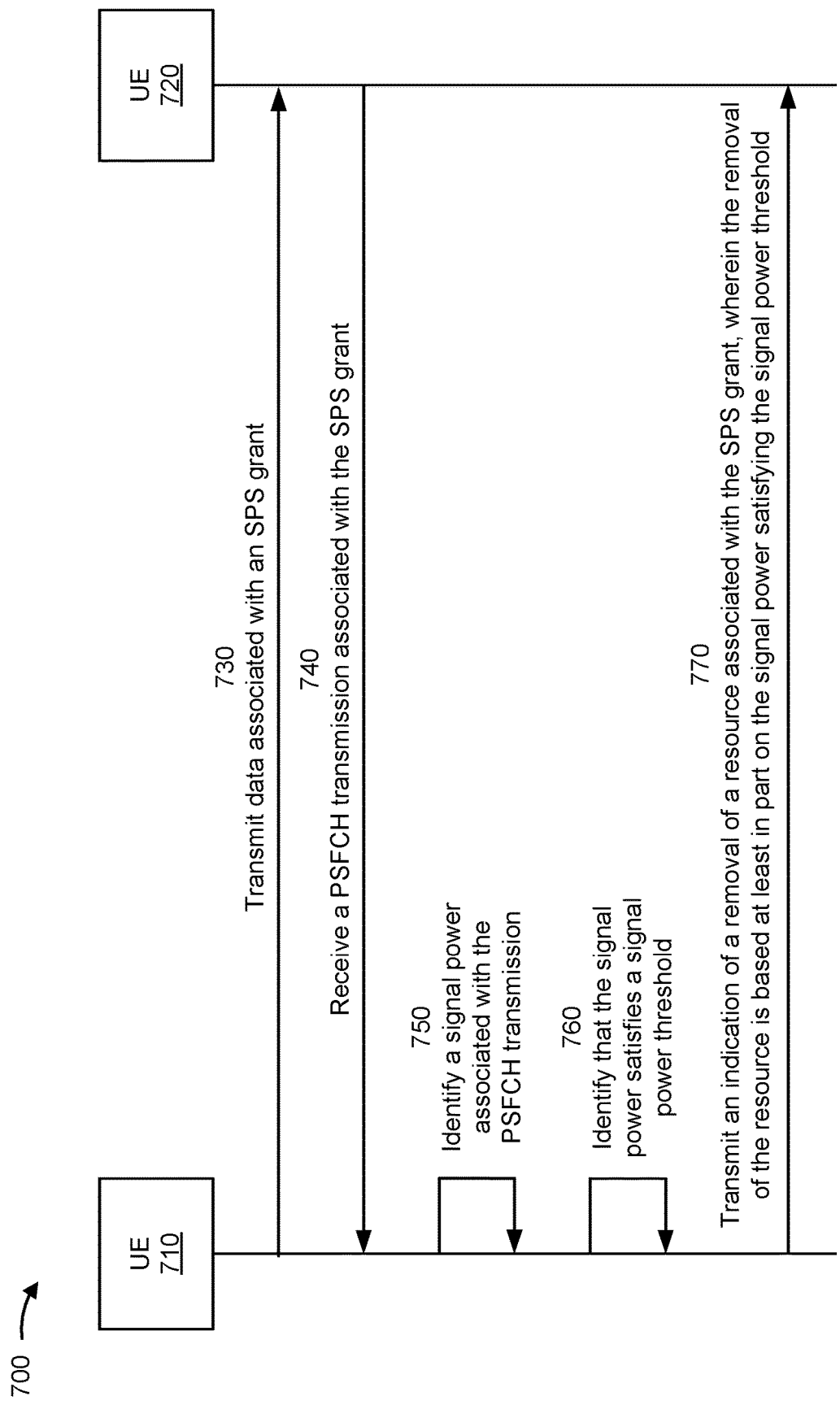
FIG. 7 is a diagram illustrating an example associated with sidelink resource removal, in accordance with the present disclosure.

FIG. 7 is a diagram illustrating an example 700 associated with sidelink resource removal, in accordance with the present disclosure. As shown in FIG. 7, a UE 710 and a UE 720 may communicate with one another over the sidelink.

As shown by reference number 730, the UE 710 transmits, to the UE 720, data associated with an SPS grant. For example, the UE 710 may transmit the data in a resource allocated by the SPS grant. The data may be carried in a physical sidelink data channel (e.g., PSSCH) transmission, which may be associated with corresponding physical sidelink control channels (PSCCHs) in the same slot (e.g., a (PSCCH/PSSCH) transmission).

As shown by reference number 740, the UE 710 receives, from the UE 720, a PSFCH transmission associated with the SPS grant. For example, the PSFCH transmission may include feedback information for the data. For example, the PSFCH transmission may indicate whether the UE 720 received the data.

As shown by reference number 750, the UE 710 identifies a signal power (e.g., a signal strength) associated with the PSFCH transmission. In some aspects, the signal power is based at least in part on a received power measurement of the PSFCH transmission. For example, the PSFCH signal may be based on an RSRP-like measurement. For example, the UE 710 may cross-correlate a sequence associated with the PSFCH signal with a known sequence and determine the received power based on the cross-correlation. In some aspects, the signal power is based at least in part on a received signal strength indicator measurement of a resource block associated with (e.g., carrying) the PSFCH transmission.

As shown by reference number 760, the UE 710 identifies that the signal power satisfies a signal power threshold (e.g., a signal strength threshold). For example, if the signal power does not satisfy the signal power threshold, then the failure may be a minor failure, and if the signal power satisfies the signal power threshold, then the failure may be a major failure. The failure may be a minor failure when the signal power does not satisfy the signal power threshold because, in a minor failure, relatively few UEs (e.g., UE 720) may fail to decode the packet, and those UEs may typically be far from the transmitter (e.g., UE 710). Therefore, the PSFCH transmitted by those UEs may reach the transmitter at a relatively low signal power. On the other hand, the failure may be a major failure when the signal power satisfies the signal power threshold because, in a major failure, relatively many UEs (e.g., UE 720) may fail to decode the packet, and at least some of those UEs may typically be close to the transmitter (e.g., UE 710). Therefore, the PSFCH transmitted by those UEs may reach the transmitter at a relatively high signal power. As a result, the PSFCH transmission signal power (e.g., the power of the received signal at the PSFCH resource associated with the PSCCH/PSSCH transmission) may indicate whether the data transmission failed due to a major failure. In example 700, because the UE 710 identifies that the signal power satisfies the signal power threshold, the data transmission may have failed due to a major failure.

In some aspects, the signal power threshold may be based at least in part on a congestion level. For example, the signal power threshold may be relative to the congestion level of a system including at least the UE 710 and/or the UE 720. For example, if the congestion level is relatively high, then a failure may be considered a major failure when there is relatively high interference, and thus, the signal power threshold may be relatively high. If the congestion level is relatively low, then a failure may be considered a major failure when there is relatively low interference, and thus, the signal power threshold may be relatively low.

In some examples, the UE 710 may measure a congestion metric, such as channel busy ratio (CBR), determine the congestion level, and map the congestion level to a corresponding signal power threshold. In some examples, multiple UEs (e.g., including the UE 710 and/or the UE 720) may report congestion-related measurements (e.g., CBR) to a network and/or server. The network and/or server may aggregate (e.g., average) the reports from UEs in the same area (e.g., geographic area). For instance, the network and/or server may configure each UE in the geographic area with the aggregated congestion level, and each UE may map the aggregated congestion level to a corresponding signal power threshold. Alternatively, the network and/or server may configure each UE with the signal power threshold directly.

In some aspects, the signal power threshold may be based at least in part on a priority of a transport block (TB) (e.g., the data, such as data in a sidelink packet associated with the priority). For example, the signal power threshold may be relative to the priority. The priority may be determined based on any suitable priority framework and/or priority indication (e.g., "sl-Priority-NACK"). A lower priority may correspond to a lower signal power threshold (e.g., a lower RSRP threshold), or a lower priority may correspond to a higher signal power threshold (e.g., a higher RSRP threshold). For example, in a case where a lower priority message interferes with a higher priority message, and the lower priority corresponds to a lower signal power threshold, the UE 710 may determine that the failure is a major failure for the lower priority message and perform reselection for the lower priority message. In a case where a lower priority message interferes with a higher priority message, and the lower priority corresponds to a higher signal power threshold, the UE 710 may determine that the failure is a major failure for the higher priority message and perform reselection for the higher priority message.

As shown by reference number 770, the UE 710 may transmit an indication of a removal of a resource associated with the SPS grant. For example, the resource may be the transmission resource on which the data was transmitted. The removal of the resource may be based at least in part on the signal power satisfying the signal power threshold. In some examples, the indication of the removal of the resource may be implicit. For example, the UE 710 may transmit an SCI that does not include an indication of the resource (before the resource was removed, the UE 710 may have transmitted one or more SCIs that included an indication of the resource). Thus, because the failure is major, the UE 710 may remove the resource from SPS grant. In some examples, the UE 710 may remove every resource in the SPS grant. In some examples, the UE 710 may remove only the resource that was impacted (e.g., the resource carrying the data). In some examples, the UE 710 may remove the resource immediately (e.g., in the next SPS period). In some examples, the UE 710 may remove the resource after a grace time window of one or more SPS periods.

In some aspects, the UE 710 may select another resource associated with the SPS grant based at least in part on the removal of the first resource. For example, the other resource may replace the removed resource for the purpose of data transmission. Thus, because the failure is major, the UE 710 may reselect the other resource. In some examples, the UE 710 may reselect the other resource immediately (e.g., in the next SPS period). In some examples, the UE 710 may reselect the other resource after a grace time window of one or more SPS periods.

In some aspects, the PSFCH transmission may be associated with (e.g., transmitted in) an initial period of the SPS grant. For example, the UE 710 may apply the removal and/or reselection to only the first period in the SPS grant. For instance, in a case where the PSFCH transmission and another transmission that is not in an initial period of an SPS grant interfere with each other, the PSFCH transmission, but not the other transmission, may be reselected.

In some aspects, the removal of the resource is based at least in part on a counter configured to decrement based at least in part on each period of a plurality of periods of the SPS grant. For example, following the first period of the SPS grant, the counter may decrement after each SPS period. The UE 710 may remove and/or reselect the resource when the counter reach zero. After the counter reaches zero, the UE 710 may reset the counter. In some examples, the counter may be a resource reselection counter, and the UE 710 may remove and/or reselect the resource when the resource reselection counter reaches zero.

In some aspects, the counter may be configured to reset to a value within an interval that includes a plurality of candidate values. The interval may include a minimum candidate value and a maximum candidate value. For example, at each reset, the UE 710 may set the counter to a random value in the interval of [min,max]. For instance, the minimum candidate value may be five, and the maximum candidate value may be fifteen.

The minimum candidate value and/or the maximum candidate value may depend on network mobility. For example, in low network mobility conditions, the interference pattern may not change substantially, and thus higher minimum and/or maximum candidate values may be used. In high network mobility conditions, the interference pattern may change more dynamically, and thus lower minimum and/or maximum candidate values may be used.

In some aspects, one or more of the minimum candidate value or the maximum candidate value may be based at least in part on a speed associated with the UE 710 (e.g., the UE 710 may be a vehicle). The UE 710 may identify the speed of the UE 710 and may set transmission parameters (e.g., including the minimum candidate value and/or the maximum candidate value) based on the speed.

In some aspects, one or more of the minimum candidate value or the maximum candidate value may be based at least in part on a plurality of speeds associated with a plurality of UEs including the UE 710. For example, the plurality of UEs may report respective speeds of the UEs to a network and/or server. The network and/or server may aggregate the reported speed. In some examples, the network and/or server may broadcast the aggregated speed to UEs in an area (e.g., a geographic area), and the UEs (e.g., UE 710) may set the minimum candidate value and/or the maximum candidate value based on the aggregated speed. In some examples, the network and/or server may configure the minimum and/or maximum candidate values directly based on the aggregated speed.

The removal of the resource being based at least in part on the signal power associated with the PSFCH transmission satisfying the signal power threshold may enable the UE 710 to reselect to a resource where the data experiences less interference. As a result, the UE 710 may avoid data interference, which may improve data transmission, and/or avoid retransmission (e.g., based on the PSFCH triggering the retransmission), which may prevent consumption of extra resources for the transmission. Moreover, the removal of the resource being based at least in part on the signal power satisfying the signal power threshold may help to limit removal and/or reselection of resources to those resources for which the signal power satisfies the signal power threshold. Limiting removal and/or reselection of resources may contribute to the stability of the interference pattern associated with sidelink data transmissions.

The signal power being based at least in part on the received power measurement of the PSFCH transmission may enable the UE 710 to accurately determine the signal power. The signal power being based at least in part on the received signal strength indicator measurement of the resource block associated with the PSFCH transmission may be readily implemented in UE 710.

The signal power threshold being based at least in part on the congestion level may enable the signal power threshold to accurately reflect whether a failure is a major failure. The UE 710 measuring the congestion metric, determine the congestion level, and mapping the congestion level to the signal power threshold may conserve resources (e.g., network and/or server resources). Multiple UEs reporting congestion-related measurements to a network and/or server may provide more robust performance by accounting for variations in congestion (as congestion measurements in a distributed system can vary significantly from UE to UE).

The signal power threshold is based at least in part on a priority of a transport block may enable the signal power threshold to reflect whether a failure is a major failure based on priority. For example, in a case where a lower priority corresponds to a lower signal power threshold, the UE 710 may avoid removing and reselecting higher priority messages, which may protect the higher priority messages from interference in a reselected resource. In a case where a lower priority corresponds to a higher signal power threshold, the UE 710 may remove and reselect higher priority messages, which may protect the higher priority messages from interference due to the failure.

The PSFCH transmission being associated with an initial period of the SPS grant may help to avoid destabilizing a system that includes UE 710 (e.g., by limiting reselections based on the signal power to the initial period). Because resources of the initial period are not reserved, the initial period is more prone to interference than other periods of the SPS grant. The PSFCH transmission being associated with the initial period can mitigate interference due to the resources of the initial period not being reserved. Moreover, if a transmission in the initial period experiences interference, then subsequent associated transmissions are likely to also experience interference. As a result, the PSFCH transmission being associated with the initial period can mitigate interference in subsequent associated transmissions.

The removal of the resource being based at least in part on a counter can mitigate interference in a case where a first transmission does not experience significant interference but a subsequent transmission in the SPS grant does experience significant interference. For example, if the UE 710 is a vehicle, the environment around the UE 710 can change dynamically due to the mobile capabilities of vehicles. One or more of the minimum candidate value or the maximum candidate value being based at least in part on a speed associated with the UE 710 may enable the UE 710 to determine whether to perform reselection at appropriate intervals. For example, if the UE 710 moving faster causes the counter to decrease, then the environment around the UE 710 may change rapidly and the UE 710 may determine whether to perform the reselection at short intervals. One or more of the minimum candidate value or the maximum candidate value being based at least in part on a plurality of speeds associated with a plurality of UEs including the UE 710 may enable the counter to depend on the speed of other UEs (e.g., in case the environment around the UE 710 is changing due to the speed of other UEs).

As indicated above, FIG. 7 is provided as an example. Other examples may differ from what is described with respect to FIG. 7.

Figure 8:
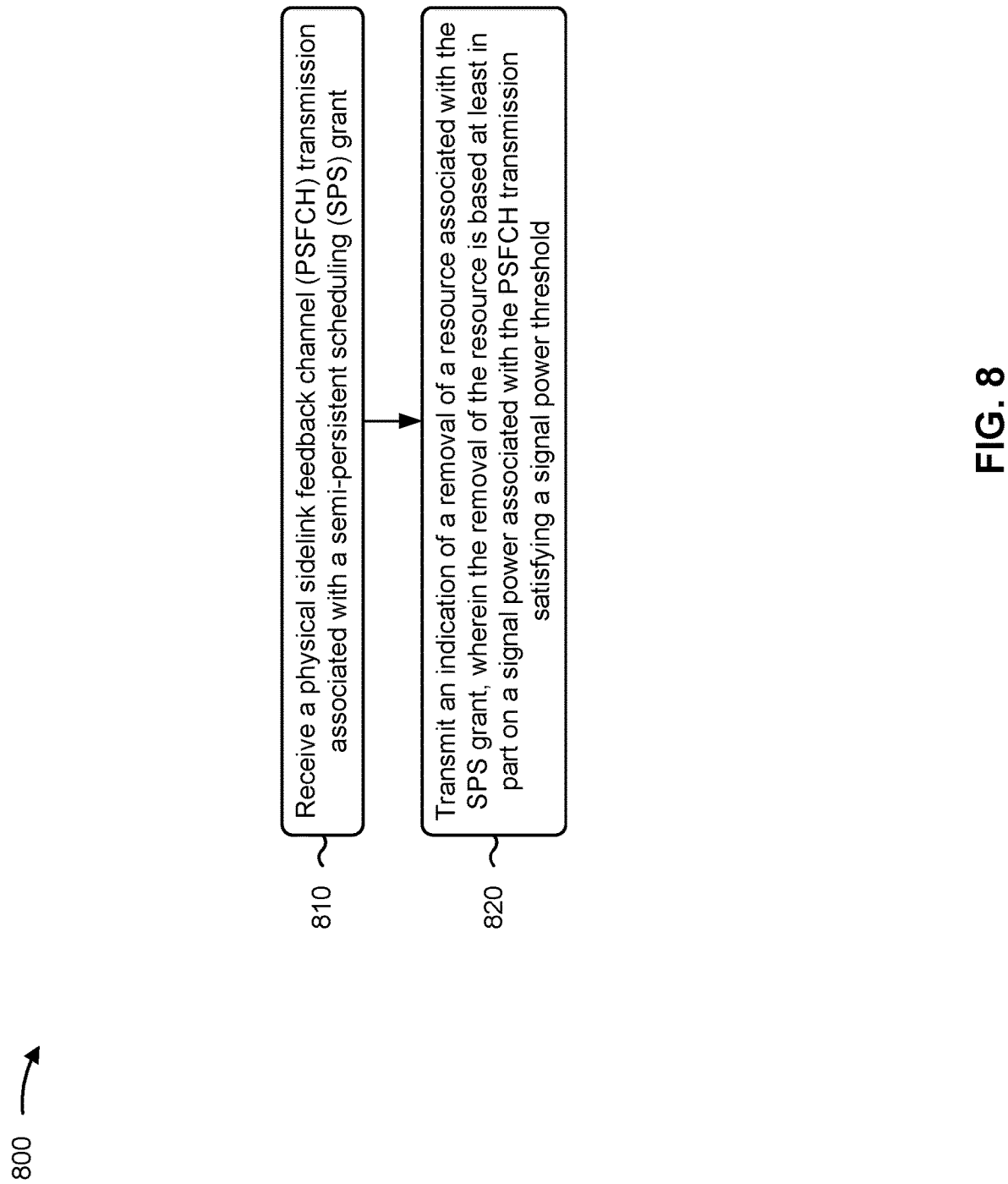
FIG. 8 is a diagram illustrating an example process performed, for example, at a UE or an apparatus of a UE, in accordance with the present disclosure.

FIG. 8 is a diagram illustrating an example process 800 performed, for example, at a UE or an apparatus of a UE, in accordance with the present disclosure. Example process 800 is an example where the apparatus or the UE (e.g., UE 120) performs operations associated with sidelink resource removal.

As shown in FIG. 8, in some aspects, process 800 may include receiving a PSFCH transmission associated with an SPS grant (block 810). For example, the UE (e.g., using communication manager 140 and/or reception component 902, depicted in FIG. 9) may receive a PSFCH transmission associated with an SPS grant, as described above, for example, with reference to FIG. 7.

As further shown in FIG. 8, in some aspects, process 800 may include transmitting an indication of a removal of a resource associated with the SPS grant, wherein the removal of the resource is based at least in part on a signal power associated with the PSFCH transmission satisfying a signal power threshold (block 820). For example, the UE (e.g., using communication manager 140 and/or transmission component 904, depicted in FIG. 9) may transmit an indication of a removal of a resource associated with the SPS grant, wherein the removal of the resource is based at least in part on a signal power associated with the PSFCH transmission satisfying a signal power threshold, as described above, for example, with reference to FIG. 7.

Process 800 may include additional aspects, such as any single aspect or any combination of aspects described below and/or in connection with one or more other processes described elsewhere herein.

In a first aspect, process 800 includes transmitting data associated with the SPS grant, and receiving the PSFCH transmission includes receiving the PSFCH transmission based at least in part on the data.

In a second aspect, alone or in combination with the first aspect, the resource is a first resource, and process 800 includes selecting a second resource associated with the SPS grant based at least in part on the removal of the first resource.

In a third aspect, alone or in combination with one or more of the first and second aspects, the signal power is based at least in part on a received power measurement of the PSFCH transmission.

In a fourth aspect, alone or in combination with one or more of the first through third aspects, the signal power is based at least in part on a received signal strength indicator measurement of a resource block associated with the PSFCH transmission.

In a fifth aspect, alone or in combination with one or more of the first through fourth aspects, the signal power threshold is based at least in part on a congestion level.

In a sixth aspect, alone or in combination with one or more of the first through fifth aspects, the signal power threshold is based at least in part on a priority of a transport block.

In a seventh aspect, alone or in combination with one or more of the first through sixth aspects, the PSFCH transmission is associated with an initial period of the SPS grant.

In an eighth aspect, alone or in combination with one or more of the first through seventh aspects, the removal of the resource is based at least in part on a counter configured to decrement based at least in part on each period of a plurality of periods of the SPS grant.

In a ninth aspect, alone or in combination with one or more of the first through eighth aspects, the counter is configured to reset to a value within an interval that includes a plurality of candidate values, and one or more of a minimum candidate value of the interval or a maximum candidate value of the interval are based at least in part on a speed associated with the UE.

In a tenth aspect, alone or in combination with one or more of the first through ninth aspects, the counter is configured to reset to a value within an interval that includes a plurality of candidate values, and one or more of a minimum candidate value of the interval or a maximum candidate value of the interval are based at least in part on a plurality of speeds associated with a plurality of UEs including the UE.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
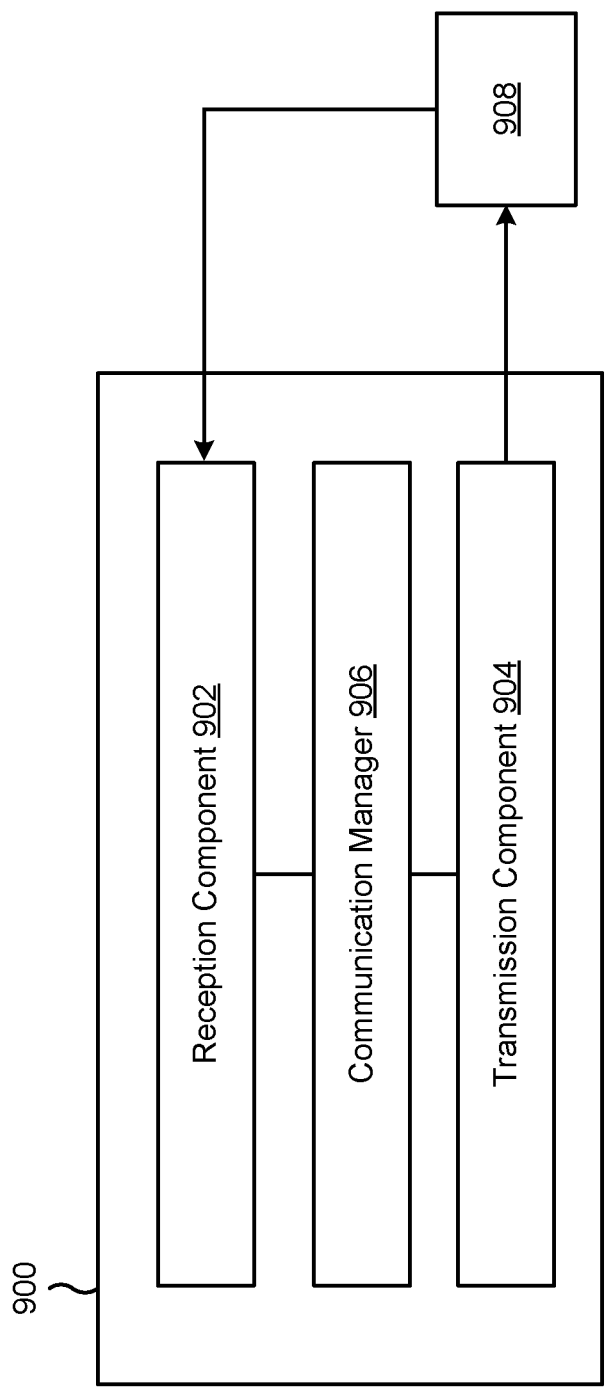
FIG. 9 is a diagram of an example apparatus for wireless communication, in accordance with the present disclosure.

FIG. 9 is a diagram of an example apparatus 900 for wireless communication, in accordance with the present disclosure. The apparatus 900 may be a UE, or a UE may include the apparatus 900. In some aspects, the apparatus 900 includes a reception component 902, a transmission component 904, and/or a communication manager 906, which may be in communication with one another (for example, via one or more buses and/or one or more other components). In some aspects, the communication manager 906 is the communication manager 140 described in connection with FIG. 1. As shown, the apparatus 900 may communicate with another apparatus 908, such as a UE or a network node (such as a CU, a DU, an RU, or a base station), using the reception component 902 and the transmission component 904.

In some aspects, the apparatus 900 may be configured to perform one or more operations described herein in connection with FIG. 7. Additionally, or alternatively, the apparatus 900 may be configured to perform one or more processes described herein, such as process 800 of FIG. 8. In some aspects, the apparatus 900 and/or one or more components shown in FIG. 9 may include one or more components of the UE described in connection with FIG. 2. Additionally, or alternatively, one or more components shown in FIG. 9 may be implemented within one or more components described in connection with FIG. 2. Additionally, or alternatively, one or more components of the set of components may be implemented at least in part as software stored in one or more memories. For example, a component (or a portion of a component) may be implemented as instructions or code stored in a non-transitory computer-readable medium and executable by one or more controllers or one or more processors to perform the functions or operations of the component.

The reception component 902 may receive communications, such as reference signals, control information, data communications, or a combination thereof, from the apparatus 908. The reception component 902 may provide received communications to one or more other components of the apparatus 900. In some aspects, the reception component 902 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 900. In some aspects, the reception component 902 may include one or more antennas, one or more modems, one or more demodulators, one or more MIMO detectors, one or more receive processors, one or more controllers/processors, one or more memories, or a combination thereof, of the UE described in connection with FIG. 2.

The transmission component 904 may transmit communications, such as reference signals, control information, data communications, or a combination thereof, to the apparatus 908. In some aspects, one or more other components of the apparatus 900 may generate communications and may provide the generated communications to the transmission component 904 for transmission to the apparatus 908. In some aspects, the transmission component 904 may perform signal processing on the generated communications (such as filtering, amplification, modulation, digital-to-analog conversion, multiplexing, interleaving, mapping, or encoding, among other examples), and may transmit the processed signals to the apparatus 908. In some aspects, the transmission component 904 may include one or more antennas, one or more modems, one or more modulators, one or more transmit MIMO processors, one or more transmit processors, one or more controllers/processors, one or more memories, or a combination thereof, of the UE described in connection with FIG. 2. In some aspects, the transmission component 904 may be co-located with the reception component 902 in one or more transceivers.

The communication manager 906 may support operations of the reception component 902 and/or the transmission component 904. For example, the communication manager 906 may receive information associated with configuring reception of communications by the reception component 902 and/or transmission of communications by the transmission component 904. Additionally, or alternatively, the communication manager 906 may generate and/or provide control information to the reception component 902 and/or the transmission component 904 to control reception and/or transmission of communications.

The reception component 902 may receive a PSFCH transmission associated with an SPS grant. The transmission component 904 may transmit an indication of a removal of a resource associated with the SPS grant, wherein the removal of the resource is based at least in part on a signal power associated with the PSFCH transmission satisfying a signal power threshold.

The transmission component 904 may transmit data associated with the SPS grant wherein receiving the PSFCH transmission includes receiving the PSFCH transmission based at least in part on the data.

The number and arrangement of components shown in FIG. 9 are provided as an example. In practice, there may be additional components, fewer components, different components, or differently arranged components than those shown in FIG. 9. Furthermore, two or more components shown in FIG. 9 may be implemented within a single component, or a single component shown in FIG. 9 may be implemented as multiple, distributed components. Additionally, or alternatively, a set of (one or more) components shown in FIG. 9 may perform one or more functions described as being performed by another set of components shown in FIG. 9.

The following provides an overview of some Aspects of the present disclosure:

Aspect 1: A method of wireless communication performed by a UE, comprising: receiving a PSFCH transmission associated with an SPS grant; and transmitting an indication of a removal of a resource associated with the SPS grant, wherein the removal of the resource is based at least in part on a signal power associated with the PSFCH transmission satisfying a signal power threshold.

Aspect 2: The method of Aspect 1, further comprising: transmitting data associated with the SPS grant, wherein receiving the PSFCH transmission includes receiving the PSFCH transmission based at least in part on the data.

Aspect 3: The method of any of Aspects 1-2, wherein the resource is a first resource, the method further comprising: selecting a second resource associated with the SPS grant based at least in part on the removal of the first resource.

Aspect 4: The method of any of Aspects 1-3, wherein the signal power is based at least in part on a received power measurement of the PSFCH transmission.

Aspect 5: The method of any of Aspects 1-4, wherein the signal power is based at least in part on a received signal strength indicator measurement of a resource block associated with the PSFCH transmission.

Aspect 6: The method of any of Aspects 1-5, wherein the signal power threshold is based at least in part on a congestion level.

Aspect 7: The method of any of Aspects 1-6, wherein the signal power threshold is based at least in part on a priority of a transport block.

Aspect 8: The method of any of Aspects 1-7, wherein the PSFCH transmission is associated with an initial period of the SPS grant.

Aspect 9: The method of any of Aspects 1-8, wherein the removal of the resource is based at least in part on a counter configured to decrement based at least in part on each period of a plurality of periods of the SPS grant.

Aspect 10: The method of Aspect 9, wherein the counter is configured to reset to a value within an interval that includes a plurality of candidate values, and wherein one or more of a minimum candidate value of the interval or a maximum candidate value of the interval are based at least in part on a speed associated with the UE.

Aspect 11: The method of Aspect 9, wherein the counter is configured to reset to a value within an interval that includes a plurality of candidate values, and wherein one or more of a minimum candidate value of the interval or a maximum candidate value of the interval are based at least in part on a plurality of speeds associated with a plurality of UEs including the UE.

Aspect 12: An apparatus for wireless communication at a device, the apparatus comprising one or more processors; one or more memories coupled with the one or more processors; and instructions stored in the one or more memories and executable by the one or more processors to cause the apparatus to perform the method of one or more of Aspects 1-11.

Aspect 13: An apparatus for wireless communication at a device, the apparatus comprising one or more memories and one or more processors coupled to the one or more memories, the one or more processors configured to cause the device to perform the method of one or more of Aspects 1-11.

Aspect 14: An apparatus for wireless communication, the apparatus comprising at least one means for performing the method of one or more of Aspects 1-11.

Aspect 15: A non-transitory computer-readable medium storing code for wireless communication, the code comprising instructions executable by one or more processors to perform the method of one or more of Aspects 1-11.

Aspect 16: A non-transitory computer-readable medium storing a set of instructions for wireless communication, the set of instructions comprising one or more instructions that, when executed by one or more processors of a device, cause the device to perform the method of one or more of Aspects 1-11.

Aspect 17: A device for wireless communication, the device comprising a processing system that includes one or more processors and one or more memories coupled with the one or more processors, the processing system configured to cause the device to perform the method of one or more of Aspects 1-11.

Aspect 18: An apparatus for wireless communication at a device, the apparatus comprising one or more memories and one or more processors coupled to the one or more memories, the one or more processors individually or collectively configured to cause the device to perform the method of one or more of Aspects 1-11.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or any conventional processor, controller, microcontroller, or state machine. A processor also may be implemented as a combination of computing devices, for example, a combination of a DSP and a microprocessor, a plurality of microprocessors, one or more microprocessors in conjunction with a DSP core, or any other such configuration. In some aspects, particular processes and methods may be performed by circuitry that is specific to a given function.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A user equipment (UE) for wireless communication, comprising:
   one or more memories; and
   one or more processors, coupled to the one or more memories, configured to cause the UE to:
      receive a physical sidelink feedback channel (PSFCH) transmission associated with a semi-persistent scheduling (SPS) grant; and
      transmit an indication of a removal of a resource associated with the SPS grant, wherein the removal of the resource is based at least in part on a signal power associated with the PSFCH transmission satisfying a signal power threshold.

2. The UE of claim 1, wherein the one or more processors are further configured to cause the UE to:
   transmit data associated with the SPS grant,
      wherein the one or more processors, to cause the UE to receive the PSFCH transmission, are configured to cause the UE to receive the PSFCH transmission based at least in part on the data.

3. The UE of claim 1, wherein the resource is a first resource, and wherein the one or more processors are further configured to cause the UE to:

select a second resource associated with the SPS grant based at least in part on the removal of the first resource.

4. The UE of claim 1, wherein the signal power is based at least in part on a received power measurement of the PSFCH transmission.

5. The UE of claim 1, wherein the signal power is based at least in part on a received signal strength indicator measurement of a resource block associated with the PSFCH transmission.

6. The UE of claim 1, wherein the signal power threshold is based at least in part on a congestion level.

7. The UE of claim 1, wherein the signal power threshold is based at least in part on a priority of a transport block.

8. The UE of claim 1, wherein the PSFCH transmission is associated with an initial period of the SPS grant.

9. The UE of claim 1, wherein the removal of the resource is based at least in part on a counter configured to decrement based at least in part on each period of a plurality of periods of the SPS grant.

10. The UE of claim 9, wherein the counter is configured to reset to a value within an interval that includes a plurality of candidate values, and wherein one or more of a minimum candidate value of the interval or a maximum candidate value of the interval are based at least in part on a speed associated with the UE.

11. The UE of claim 9, wherein the counter is configured to reset to a value within an interval that includes a plurality of candidate values, and wherein one or more of a minimum candidate value of the interval or a maximum candidate value of the interval are based at least in part on a plurality of speeds associated with a plurality of UEs including the UE.

12. A method of wireless communication performed by a user equipment (UE), comprising:
receiving a physical sidelink feedback channel (PSFCH) transmission associated with a semi-persistent scheduling (SPS) grant; and
transmitting an indication of a removal of a resource associated with the SPS grant, wherein the removal of the resource is based at least in part on a signal power associated with the PSFCH transmission satisfying a signal power threshold.

13. The method of claim 12, further comprising:
transmitting data associated with the SPS grant,
wherein receiving the PSFCH transmission includes receiving the PSFCH transmission based at least in part on the data.

14. The method of claim 12, wherein the resource is a first resource, the method further comprising:
selecting a second resource associated with the SPS grant based at least in part on the removal of the first resource.

15. The method of claim 12, wherein the signal power is based at least in part on a received power measurement of the PSFCH transmission.

16. The method of claim 12, wherein the signal power is based at least in part on a received signal strength indicator measurement of a resource block associated with the PSFCH transmission.

17. A non-transitory computer-readable medium storing a set of instructions for wireless communication, the set of instructions comprising:
one or more instructions that, when executed by one or more processors of a user equipment (UE), cause the UE to:
receive a physical sidelink feedback channel (PSFCH) transmission associated with a semi-persistent scheduling (SPS) grant; and
transmit an indication of a removal of a resource associated with the SPS grant, wherein the removal of the resource is based at least in part on a signal power associated with the PSFCH transmission satisfying a signal power threshold.

18. The non-transitory computer-readable medium of claim 17, wherein the one or more instructions further cause the UE to:
transmit data associated with the SPS grant,
wherein the one or more instructions, that cause the UE to receive the PSFCH transmission, cause the UE to receive the PSFCH transmission based at least in part on the data.

19. The non-transitory computer-readable medium of claim 17, wherein the resource is a first resource, and wherein the one or more instructions further cause the UE to:
select a second resource associated with the SPS grant based at least in part on the removal of the first resource.

20. The non-transitory computer-readable medium of claim 17, wherein the signal power is based at least in part on a received power measurement of the PSFCH transmission.

* * * * *